United States Patent
Niu et al.

(10) Patent No.: US 8,331,232 B2
(45) Date of Patent: *Dec. 11, 2012

(54) METHOD AND APPARATUS FOR IMPROVING DATA TRANSMISSION IN ROUTER FABRIC CARDS THROUGH PSEUDO-SYNCHRONOUS DATA SWITCHING

(75) Inventors: I-Sing Roger Niu, San Jose, CA (US);
Ying Wang, Mountain View, CA (US);
Russell R. Tuck, III, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 377 days.

This patent is subject to a terminal disclaimer.

(21) Appl. No.: 12/783,908

(22) Filed: May 20, 2010

(65) Prior Publication Data
US 2010/0232425 A1    Sep. 16, 2010

Related U.S. Application Data

(63) Continuation of application No. 12/136,612, filed on Jun. 10, 2008, now Pat. No. 7,733,775, which is a continuation of application No. 10/821,367, filed on Apr. 9, 2004, now Pat. No. 7,385,922, which is a continuation of application No. 09/872,080, filed on Jun. 1, 2001, now Pat. No. 6,721,312.

(51) Int. Cl.
*H04J 3/00* (2006.01)
*H04L 12/56* (2006.01)

(52) U.S. Cl. .......... 370/230; 370/392; 370/474
(58) Field of Classification Search ............ None
See application file for complete search history.

(56) References Cited

U.S. PATENT DOCUMENTS

| 5,838,684 A * | 11/1998 | Wicki et al. ........ 370/416 |
| 6,229,812 B1 * | 5/2001 | Parruck et al. ...... 370/412 |
| 6,266,338 B1 * | 7/2001 | Simon et al. ........ 370/412 |
| 6,295,295 B1 * | 9/2001 | Wicklund ............ 370/392 |
| 6,510,138 B1 * | 1/2003 | Pannell ................ 370/236 |
| 7,106,738 B2 * | 9/2006 | Saidi et al. .......... 370/392 |

* cited by examiner

*Primary Examiner* — Chi Pham
*Assistant Examiner* — Soon-Dong D Hyun
(74) *Attorney, Agent, or Firm* — Donald R. Boys; Central Coast Patent Agency Inc.

(57) ABSTRACT

In a data packet router, a router fabric card for routing data packets is provided. The router fabric card comprises a plurality of ingress/egress ports, the ports connected through a switching facility for switching connection states of the port paths between individual ingress paths and individual egress paths on the fabric card, and a scheduling component for scheduling communication between ports on the fabric card. Data coming into ingress on the card is organized into individual data-packet trains, each individual train comprising data packets and inserted data denoting a starting point and an ending point of a train. The switching facility recognizes the start data and the end data of a train and switches port paths to a next-assigned connection state accordingly.

2 Claims, 4 Drawing Sheets

METHOD AND APPARATUS FOR IMPROVING DATA TRANSMISSION IN ROUTER FABRIC CARDS THROUGH PSEUDO-SYNCHRONOUS DATA SWITCHING

The present application is a continuation application of co-pending patent application Ser. No. 12/136,612, filed on Jun. 10, 2008, which is a continuation of Ser. No. 10/821,367, filed on Apr. 9, 2004 and issued as 7385922 on Jun. 10, 2008, which is a continuation of application Ser. No. 09/872,080, filed Jun. 1, 2001 and issued as 6721312 on Apr. 13, 2004. The prior applications are incorporated herein in their entirety at least by reference.

BACKGROUND OF THE INVENTION

1. Field of the Invention

The present invention is in the field of hardware and software for data packet routers and pertains particularly to methods for improving data processing rates within the router fabric of such data packet routers.

2. Discussion of the State of the Art

With the advent and continued development of the well-known Internet network, and of similar data-packet networks, much attention has been paid to computing machines for receiving, processing, and forwarding data packets. Such computing machines, known as routers in the art, typically have multiple interfaces for receiving and sending packets, and circuitry coupled at each interface, including typically a packet processor, for handling and processing packets. The circuitry at the interfaces is typically implemented on modules known as line cards in the art, and all of the line cards are typically interconnected. In systems known to the present inventor interconnection is through what is known as the internal fabric, which comprises interconnected fabric cards.

A fabric card known to the inventor supports a plurality of ingress/egress data ports and a crossbar switching facility for switching traffic in the card from port to port. The ports and switching facility are implemented in the form of ASIC chips that are typically clocked in a synchronous mode according to a master clock signal.

The switching facility of the above-described fabric card is a bit-sliced ASIC partitioned into several identical slices known as cross-point ASICS (CPAs). Each slice is adapted to handle switched transmission of a bit portion of each data packet received from a sending port that is transmitting data destined for another port. Also included in this facility is a chip (ASIC) adapted to schedule communication between the ports on the card. This ASIC is termed a cross-point scheduling ASIC (CSA). This scheduling is accomplished, basically, on a per-request basis wherein a port issues a request to transmit on the card to a destination (another port) through the switching facility. When it is determined by the scheduling chip that the switching facility can support the switching and transmission of data (from ingress to egress), a grant is issued to the requesting port. The scheduling chip also programs each bit-slice of the facility to receive from the requesting port and to transmit to the receiving port.

The present apparatus and method known to the inventor operates in a manner that slices of a single packet are required to be sent synchronously, which imposes a unnecessary upper operating frequency limitation due to clock offset among clocked components. What is clearly needed is an apparatus and a method for managing data flow through a bit-sliced switching facility on a router fabric card that allows the CPAs to be used in a pseudo-synchronous way, improving the efficiency of use of the transmission mechanism.

SUMMARY OF THE INVENTION

In a preferred embodiment of the present invention a fabric card for routing data packets is provided, comprising a plurality of ingress/egress ports, a switching component through which the ports connect, and a scheduling component for scheduling communication between the plurality of ports through the switching component. The card is characterized in that data coming into one of the plurality of ports is organized into specific data-packet trains each having a start-of-train (SOT) identifier and an end-of-train (EOT) identifier, and wherein the switching facility recognizes the SOT and the EOT identifiers switches transmission to a next port and train accordingly.

In some embodiments of the card the switching facility comprises a plurality of individual cross-point application-specific integrated circuits (CPAs). Also in some embodiments individual ones of the CPAs further comprise a queue for listing assignments for transmission. Further there may be data queues (D-FIFOs) following individual ones of the CPAs for buffering data flow to an egress port.

Also in some embodiments of the card each port receiving data requests authorization to transmit from the scheduling component, and also sends an almost done flag (ADF) to the scheduling component prior to the EOT. In some cases the scheduling component uses the ADF to trigger scheduling the sending port for a new transmission.

In another aspect of the invention a method for high-speed transmission of packet data from ingress to egress ports connected across a fabric card through a switching component is provided, comprising the steps of (a) organizing incoming data into a packet train and inserting therein additional data comprising a start of train (SOT) and an end of train (EOT) identifier; (b) requesting permission from a scheduling component to transmit the assembled packet train from ingress to egress on the card through the switching component; (c) upon receiving authorization to transmit by an ingress port, transmitting the assembled packet train through the switching component; and (d) upon recognizing the EOT of a packet train, switching transmission to a different packet train.

In some embodiments of the method the switching facility comprises a plurality of individual cross-point application-specific integrated circuits (CPAs), and individual ones of the CPAs may further comprise a queue for listing assignments for transmission. There may also be data queues (D-FIFOs) following individual ones of the CPAs, the queues buffering data flow to an egress port. Further, each port receiving data may request authorization to transmit from the scheduling component, and also send an almost done flag (ADF) to the scheduling component prior to the EOT.

The scheduling component may also use the ADF to trigger scheduling the sending port for a new transmission.

In yet another aspect of the invention a packet switching element is provided, comprising a plurality of ingress/egress ports, and data switching components between ports. The data coming into a first one of the plurality of ports is organized into specific data-packet trains each having a start-of-train (SOT) identifier and an end-of-train (EOT) identifier, and wherein the switching element recognizes the SOT and the EOT identifiers and switches transmission to a next port and train accordingly.

In some embodiments of the switching element the data switching components comprise a plurality of individual cross-point application-specific integrated circuits (CPAs).

Also in some embodiments individual ones of the CPAs further comprise a queue for listing assignments for transmission. In other embodiments each CPAs is capable of switching to a next port assignment of its own accord. In still other embodiments there are data queues (D-FIFOs) following individual ones of the CPAs for buffering data flow to an egress port.

In some cases each port receiving data requests authorization to transmit from a scheduling component, and also sends an almost done flag (ADF) to the scheduling component prior to the EOT, and in some cases the scheduling component uses the ADF to trigger scheduling the sending port for a new transmission.

In still another aspect of the invention a data packet router is provided, comprising external ingress/egress ports for receiving and sending data packets to and from neighboring routers, and one or more packet switching elements, each having a plurality of local ingress/egress ports and data switching components between the local ports. Data coming into a first one of the plurality of ports is organized into specific data-packet trains each having a start-of-train (SOT) identifier and an end-of-train (EOT) identifier, and wherein the switching element recognizes the SOT and the EOT identifiers and switches transmission to a next port and train accordingly.

In some embodiments of the router the data switching components comprise a plurality of individual cross-point application-specific integrated circuits (CPAs). In other embodiments individual ones of the CPAs further comprise a queue for listing assignments for transmission. In still other embodiments each CPAs is capable of switching to a next port assignment of its own accord.

In some cases there are data queues (D-FIFOs) following individual ones of the CPAs for buffering data flow to an egress port. Further, each port receiving data may request authorization to transmit from a scheduling component, and also sends an almost done flag (ADF) to the scheduling component prior to the EOT. The scheduling component may use the ADF to trigger scheduling the sending port for a new transmission.

Now, for the first time, in the embodiments of the present invention described in enabling detail below, a method is provided for managing data flow through a switching facility on a router fabric card such that the negative effect of phase offsets between clocked switching components and a controlling component in synchronous mode at higher operating frequencies is eliminated, and data transmission rates are enhanced.

BRIEF DESCRIPTION OF THE DRAWING FIGURES

DESCRIPTION OF THE PREFERRED EMBODIMENTS

According to an embodiment of present invention, a method and apparatus is provided for managing data traffic through a switching facility on a fabric card in a manner that enables operation at increased data rate. The method and apparatus of the present invention is described in enabling detail below.

Figure 1:
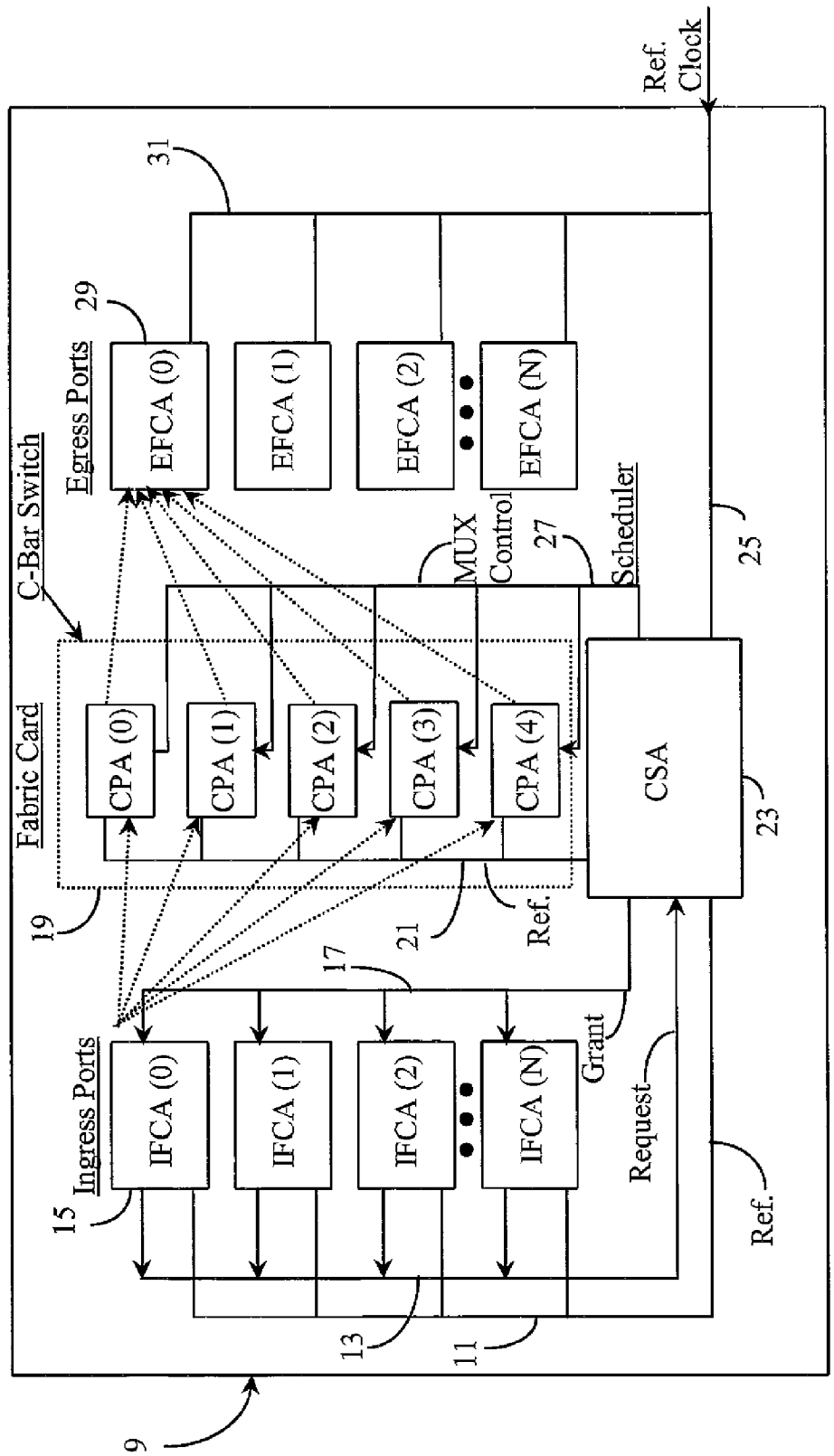
FIG. 1 is a block diagram illustrating various components and communication paths of a state-of-the-art router fabric card according to current art.

FIG. 1 is a block diagram illustrating various components, control lines, and communication paths of a router fabric card 9 known to the inventor. Further, it is to be understood that the block diagram of FIG. 1 makes no attempt to represent the actual location or geometry of elements on a fabric card.

Fabric card 9 has a plurality of ingress ports 15 supported thereon and labeled as ingress fabric card ASICs (IFCA) 0-N. In this example, the port designation 0-N indicates that there may be more IFCAs 15 than are illustrated on card 9. In actuality, there are 9 IFCA ports 15 on card 9 in one example known to the inventor. Fabric card 9 also has a plurality of egress ports 29 supported thereon and labeled egress fabric card ASIC (EFCA) 0-N. It will be appreciated by one with skill in the art that there will typically be the same number of EFCAs 29 as there are IFCAs 15 on card 9. In an actual implementation, an IFCA and an EFCA are part of a same ASIC chip comprising one ingress/egress port. IFCA ports 0-N are adapted to receive incoming data on card 9 and to forward that data to EFCA ports 0-N based upon packet destination. A switching facility 19, labeled a C-Bar Switch in this example (crossbar) is illustrated logically between ingress ports 15 and egress ports 29. Switching facility 19 is illustrated as comprising a plurality of components termed cross-point-ASICs (CPAs) and labeled CPA 0-4 in this example. Each CPA 0-4 is responsible for processing an assigned bit portion of each data packet sent from an ingress port 15 and destined for an egress port 29.

A cross-point scheduling ASIC (CSA) 23 is illustrated as implemented on card 9 and associated with switching facility 19. CSA 23 is responsible for scheduling communication between ingress ports 15 and egress ports 29 through switching facility 19. In one embodiment, it may be assumed that switching facility 19 comprises CPAs 0-4 and CSA 23 implemented as a single switching and scheduling component (ASIC) termed a cross-bar switch. The inventor chooses to separate CPAs 0-4 from CSA 23 as illustrated by a dotted rectangle (enclosing CPAs 0-4) for the purpose of logically separating and describing functions.

CSA 23 controls programming and scheduling of CPAs 0-4 in this example via a MUX control line 27. Among the duties of CSA 23 is to schedule which of IFCA 0-N will be granted transmission through switching facility 19 at a given point in time. When a particular IFCA port has been granted permission to transmit data, CSA 23 must program each of CPAs 0-4 to receive data from the target IFCA port. CSA 23 communicates with CPA 0-4 through MUX control line 27 as previously described.

It is noted herein that fabric card 9 is illustrated, in this example, in the form of a logical block diagram. Actual chip implementation, including circuitry (logic gates), data registers, encoder/decoder circuits, and other common components known to be present and supported within IC components on a router fabric card are not detailed in this example. The inventor chooses this simple block representation in order to describe current function and relationship between illustrated components only.

As previously described above, each CPA transmits a portion (slice) of the data for a packet, and the operation is orchestrated so that each CPA captures its portion of the data in the same cycle, so that all of the data is transferred in the same cycle, whether all of the CPAs are needed in the transfer or not, and whether or not all have captured their portion of the data or not. The actual transfer requires that all CPAs are ready, and is not complete until the last slice is transferred; then the CPAs may be set up for another packet from the same or another port.

In operation of fabric card 9, CSA 23 receives a request for permission to transmit from one of IFCAs 0-N. Propagation of such a request is logically illustrated herein by a line 13 labeled Request emanating from IFCAs 0-N and leading to CSA 23. Upon receiving a request for permission to transmit, CSA 23 must check status of each of CPAs 0-4 to ensure that they are ready to receive data from the requesting port. When CSA 23 determines that all of CPAs 0-4 are ready to receive data from a next port, a grant to transmit is issued by CSA 23 to the requesting IFCA port. Grant issuance is illustrated herein by a line 17 labeled Grant emanating from CSA 23 and branching into IFCAs 0-N. In this case, IFCA 0 has sent a request to CSA 23 and has been issued a grant for transmitting data. CPAs 0-4 share in the processing of data from each data packet transmitted by IFCA 0. This is logically illustrated herein by a plurality of dotted directional arrows emanating from IFCA 0 and progressing to CPAs 0-4. The exact byte assignment is depended from design considerations Data output from CPAs 0-4 in this example is transmitted to EFCA 0, which in this case is the packet-assigned destination port for egress from fabric card 9. Data transmission from CPAs 0-4 to EFCA 0 is illustrated logically herein by a plurality of dotted directional arrows emanating from CPAs 0-4 and progressing into EFCA 0. All ingress ports 15 and egress ports 29 are coupled such that any port 15 may transmit through facility 19 to any port 29.

Figure 2:
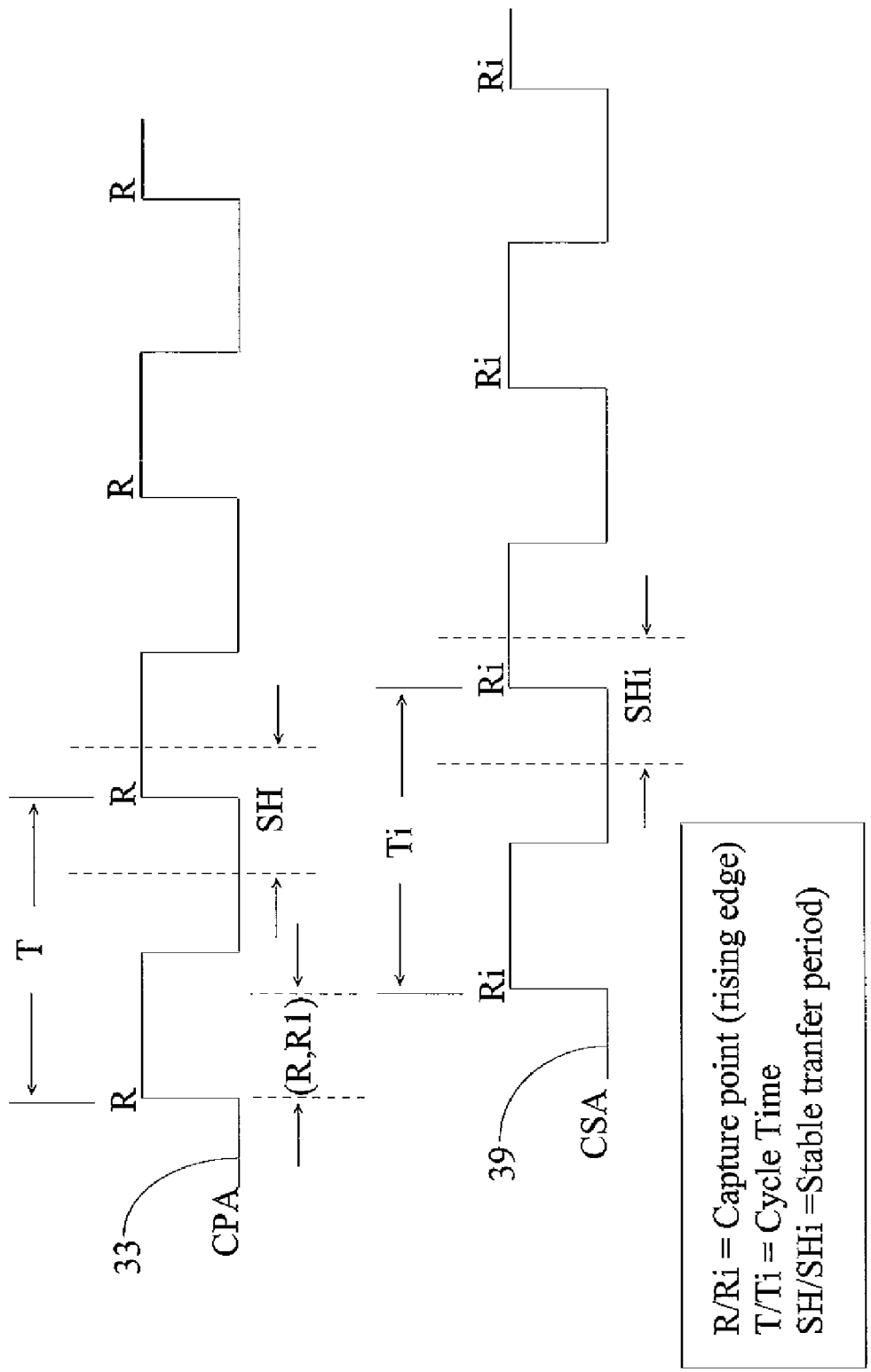
FIG. 2 is a waveform diagram illustrating a comparison of attributes of waveforms in separate components of the fabric card of FIG. 1.

FIG. 2 is a waveform diagram illustrating a comparison of attributes of timing waveforms in separate components of the fabric card of FIG. 1. In this example, there are two separate waveforms illustrated. These are a waveform 33 labeled CPA (cross point ASIC), and a waveform 39 labeled CSA (cross point scheduling ASIC). Waveform 33 can be that of any one of CPAs 0-4 of FIG. 1 above. Waveform 39 is that of CSA 23 of FIG. 1 above. The skilled artisan will be aware that these waveforms are represented ideally, as examples.

In CPA waveform 33, data capture is initiated at R illustrated (at each rising edge). Time (T) represents a given time period between any 2 successive rising edges R of waveform 33, therefore the Cycle time. Time period (SH) represents a stable transfer period wherein data must be available and stable to be captured. The same parameters described above for CPA waveform 33 are also illustrated for CSA waveform 39. These are Ri, Ti, and SHi.

As described above, all clocked components are being driven by a single clock signal. Because of a number of variables, however, the operation of different components can be phase offset. The phase offset between the two waveforms illustrated in FIG. 2 is represented by (R,Ri). In a perfect state waveforms 33 and 39 would perfectly align with each other and all parameters would remain equal in value across both waveforms.

This offset phenomenon imposes limitations on the performance of card 9 of FIG. 1. For example, knowing that CPA waveform 33 is non-aligned in time with CSA waveform 39, one can quantify phase offset value for (R,Ri). Offset (R,Ri) must be added to SHi of CSA waveform 39 and that subtracted from T (or Ti) to determine the time frame (window) to receive new data from a next port. Because of this, under badly skewed conditions, and especially at higher clock rates, waveform 33 will experience a proportionately smaller window of data capture and incorrect data may be captured. At higher frequencies the time of opportunity becomes even smaller, because the time difference between rising edges is proportionately smaller.

Further to the above, there are 5 CPAs for CSA 23 of FIG. 1 to program, and skew conditions vary from one CPA to another. If a particular CPA experiences a very large skew, then it is possible that the window of opportunity for capturing data will be small enough to cause that CPA to capture incorrect data. It is clearly not practical to operate a system like the system shown in FIG. 1 at a very high frequency in a synchronous manner, in which CSA, CPA, IFCA and EFCA's clock are all required to be aligned to each other almost perfectly.

Figure 3:
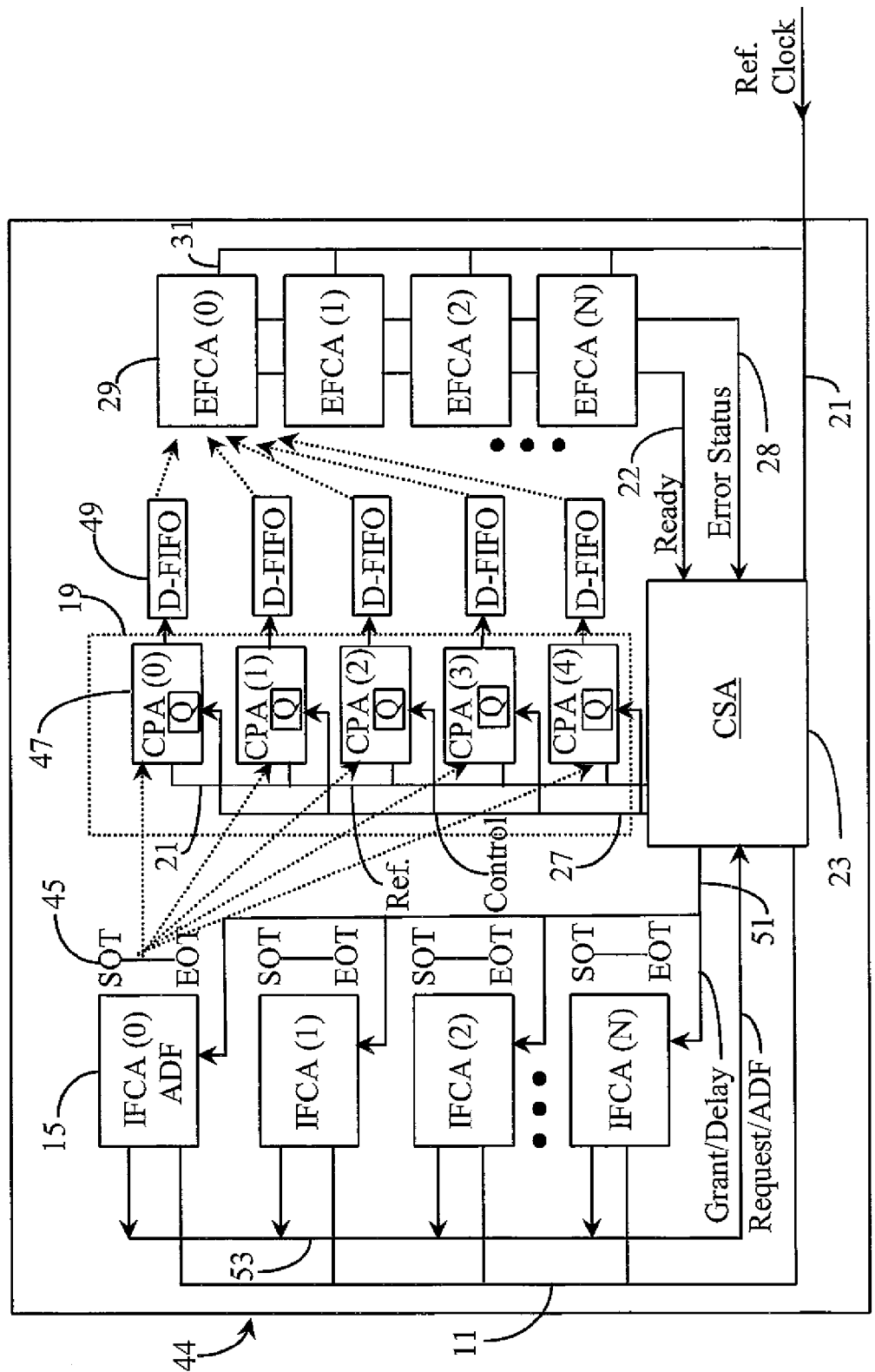
FIG. 3 is a block diagram illustrating various components and communication paths of a router fabric card according to an embodiment of the present invention.

FIG. 3 is a block diagram illustrating components and communication paths of a router fabric card 44 according to an embodiment of the present invention. Fabric card 44 operates very similarly to fabric card 9 described with reference to FIG. 1, and retains all of the original components and configuration already described with reference to FIGS. 1 and 2. Therefore, many elements of FIG. 1 bear the same element numbers as in FIG. 1, and are not re-introduced as new elements.

Fabric card 44 supports IFCA ports 0-N (15) and EFCA ports 0-N (29), as well as a switching facility 19 comprising CPAs 0-4 and CSA 23, just as described for card 9 of FIG. 1. Similar to the embodiment of FIG. 1, each clocked component just described is driven by a common clock signal illustrated as supplied by clock lines 25, 31, 11, and 21. A master clock (not shown) provides the clock signal.

In this embodiment each CPA 0-4 has an assignment queue (Q) provided therein and configured as a first-in-first-out (FIFO) queue for storing port assignments issued from CSA 23. CSA 23 utilizes control line 27 to deliver port configuration assignments to each CPA 0-4. Also in this example, each CPA 0-4 has a dual FIFO queue (D-FIFO) 49 provided and configured for buffering data before transmitting to any egress (EFCA). More detail about significance of D-FIFO 49 is provided below.

As was described with reference to FIG. 1, CPAs 0-4 simultaneously process data transmitted from essentially one IFCA 0-N at a time. An enhancement in this embodiment provided within IFCAs 0-N enables re-packing of data packets such that they are transmitted in what is termed a data train by the inventor. An indication of such a train (45) is logically illustrated to the right of each IFCA 0-N. A train as used in this specification defines an ordered plurality of data packets transmitted from a same IFCA port and destined to a same EFCA port. At the beginning of each train, a word defining the start of the train (SOT) is generated and inserted into the data at the beginning of transmission and a word defining the end of the train (EOT) is generated and inserted at the end of a train. Each SOT and EOT comprises a plurality of bytes that are distributed among CPAs 0-4 during data transmission. This ensures that each CPA 0-4 will receive a SOT indicator and an EOT indicator for every train processed.

A data re-packing module (not shown) is provided within each IFCA 0-N and programmed to organize the data packets in a FIFO queue and insert the SOT and EOT characters. Once a train is assembled within any one of IFCAs 0-N then it is ready for transmission to CPAs 0-4.

In this embodiment, CPAs 0-4 are firmware and hardware enhanced to recognize the SOT and EOT designators and act upon such information to effect their own adoption of a next assignment and to switch for receipt-of-transmission from a next IFCA port. In this case, CSA 23 is relieved of the responsibility of setting up and holding CPAs 0-4 for a next port transmission. However, CSA 23 still schedules port assignments into each CPA 0-4 by entering them into (Q) at each CPA 0-4. This is logically illustrated using control line 27, however, the label MUX (from FIG. 1) has been dropped to indicate MUX control is no longer needed.

In this example, there is illustrated active communication between IFCA 0 through switching facility 19 to EFCA 0. Similar to the method described with reference to FIG. 1 above, the data transfer is illustrated logically by dotted directional arrows emanating from IFCA 0, progressing into each of CPAs 0-4 within switching facility 19 and then emanating from each D-FIFO 49 and progressing to EFCA 0. A novel difference in the way that CPAs 0-4 operate within switching facility 19 of fabric card 44 is that each CPA 0-4 switches of its own accord to a next assignment after recognition of an EOT designator at the end of a train of data packets.

Each CPA 0-4, upon recognition of an EOT pulls its next port configuration assignment from (Q), sets up to receive, and begins to look for an SOT from the assigned port. CSA 23 no longer performs setting up CPAs to receive data from a next port. Because of this, the skew phenomenon identified with reference to FIG. 1 and in the background section is no longer an impediment to system performance. Each CPA 0-4, upon recognition of an EOT, will perform its own set-up and hold for the next assigned data train independently as opposed to waiting for the synchronous instruction from CSA This is why the inventor terms this scheme Pseudo-Synchronous Data Switching.

Shortly before IFCA 0 transmits an EOT at the end of a train to switching facility 19, it communicates a status flag termed an almost done flag (ADF) to CSA 23. This will give CSA 23 a head start to schedule the next train before the current one is finished which is denoted by EOT. Therefore, the latency will be reduced and transmission rate will be improved. In this example, IFCA 0 has generated an ADF flag, which is communicated to CSA 23 over logical line 53, which in this case is the same line that carries requests for transmission. Upon receiving an ADF from IFCA 0, CSA 23 immediately checks the activity states of CPAs 0-4 and determines whether or not to immediately issue a grant for transmission to a next requesting port. EFCA status is also considered as is described further below.

D-FIFOs 49 enable any one of CPAs 0-4 to begin receiving data from a next port before data from a previous port is completely transmitted (emptied from queue) to an EFCA port. In this way, flexibility is provided to switching facility 19 for buffering a certain amount of data transmission to CPAs. If CSA 23 determines that all D-FIFOs 49 are sufficiently free for accepting a next data train from a next requesting port, then a grant for transmission is issued to the next requesting port. If, however, it is determined that one or more D-FIFOs 49 are yet unable to receive data, then CSA 23 sends a predetermined delay signal to the next requesting IFCA port. Moreover, CSA 23 may now stack assignments in queue (Q) for CPAs 0-4. Control line 27 (formerly MUX control 27 of FIG. 1) is used for queuing port assignments. It is reminded herein that all communication and control lines are logically illustrated in this example to aid in description.

EFCA ports 0-N buffer data in a queue (not shown) when received and are programmed to report to CSA 23 when ready to receive new data according to queue level. This is accomplished via a report line 22, labeled Ready. EFCAs 0-N also operate in an embodiment according to an error reporting scheme (not illustrated) adapted to report to CSA 23 any errors related to SOT/EOT miss-alignment and/or missing SOT/EOT characters. This is accomplished via a report line 28, labeled Error Status. Upon receiving an error report from any of EFCAs 0-N, CSA 23 works to remedy the situation by using any one or a combination of several schemes, including stopping a grant for transmission, inserting a timed delay in transmission, ordering flushing of data from queues and so on.

It will be apparent to one with skill in the art that communication paths and control lines that are logically illustrated in the drawings and described herein do not reflect actual parallel and serial lines used in actual fabric cards. Similarly, internal logic, comprising gates, MUX circuits, data registers, encoding/decoding circuits, data re-packing modules, and so on, are not illustrated in this example so as not to detract from clear explanation of the invention. There are many ways in the art this logic may be implemented without departing from the spirit and scope of the invention.

Through empirical method, it has been determined by the inventor that providing an organized packet train, including a start and end designator, and adapting components (chiefly CPAs 0-4) of a fabric card with intelligence to recognize the SOT and EOT, along with self-programming capability from queue, enables the card to be operated at much higher data rates than was previously possible in the art.

Figure 4:
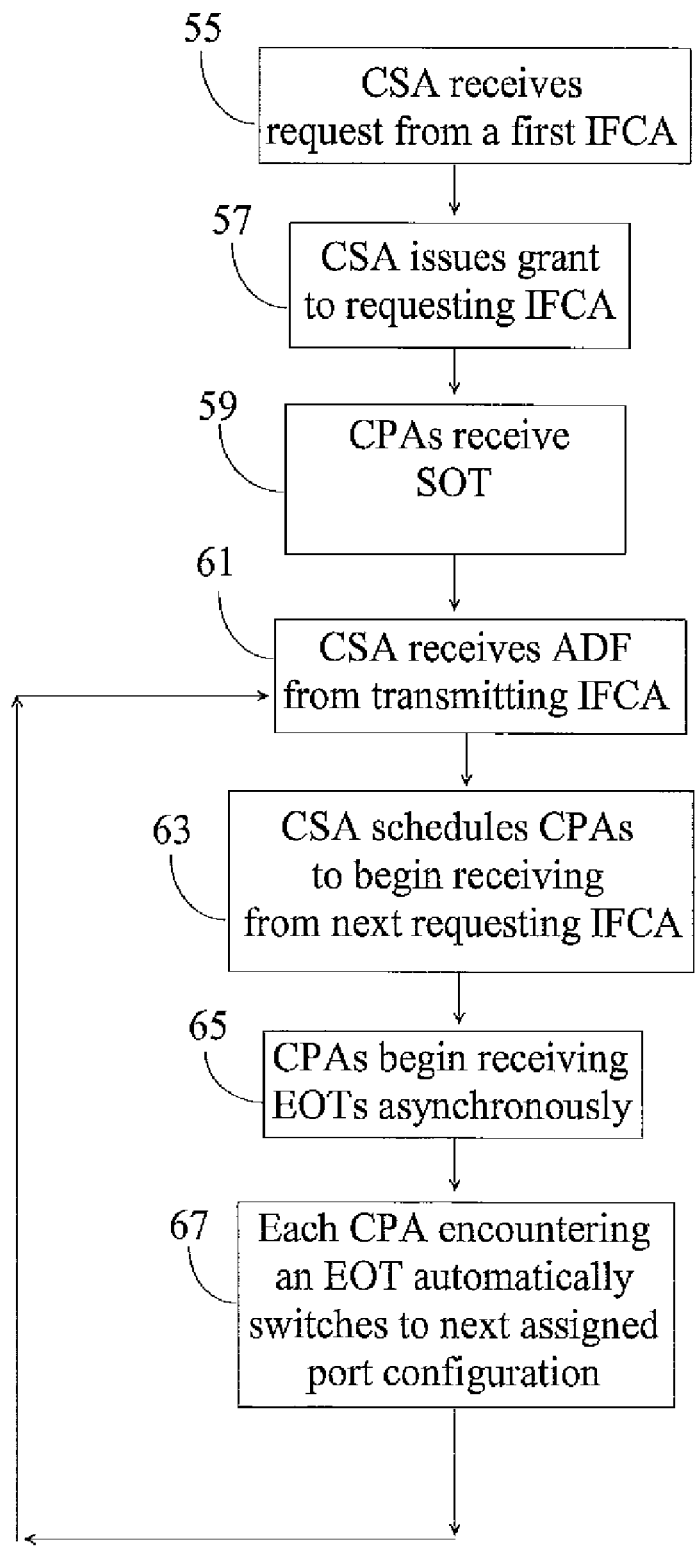
FIG. 4 is a flow diagram illustrating various steps for scheduling and facilitating port communication on the fabric card of FIG. 3 according to an embodiment of the present invention.

FIG. 4 is a flow diagram illustrating steps in practicing the invention in one embodiment using fabric card of FIG. 3 according to one embodiment of the present invention. It is noted herein that the following steps are exemplary only and are meant to illustrate just one process for practicing the invention.

At step 55, CSA 23 receives a request for transmission from one of IFCAs 0-N (FIG. 3). At step 57, CSA 23 issues a grant to the requesting IFCA to begin transmission. This step assumes that the CPAs and the designated EFCA are determined by CSA 23 to be ready to receive data.

At step 59, the CPAs receive SOT characters at the beginning of transmission of a data-packet train. It is noted herein that the inserted SOT is sufficiently wide in terms of data bits that all CPAs are able to receive and recognize it.

At step 61, CSA 23 receives an ADF flag from the transmitting IFCA indicating that it is near completion of its transmission. At step 63, CSA 23 schedules CPAs 0-4 to begin receiving data from a next requesting port. This step assumes a next request from an IFCA was received at CSA and granted. Scheduling in this example is performed by CSA queuing the next port assignment into a queue (Q) at each CPA. It's noted herein that, at step 63, the $1^{st}$ train from step 55 is not yet finished, but the CSA has started to schedule transmission for a next train.

At step 65, CPAs 0-4 begin receiving EOT characters. At step 67, each CPA 0-4 having received an EOT character from the data packet train sent by the IFCA of step 55 automatically configures itself for the next assignment queued at step 63 (if any). Control at this point reverts to step 61, and train transmission continues as needed.

It will be apparent to one with skill in the art that the process steps illustrated herein may be further divided into sub-steps without departing from the spirit and scope of the present invention. It will also be apparent that steps in other embodiments may have a different order without departing from the spirit and scope of the invention. The inventor intends that the above-described process steps represent just one sequence according to an embodiment of the invention for facilitating port-to-port data forwarding through a switching facility of a fabric card. It will also be apparent to one with skill in the art that the method and apparatus of the present invention may be employed in any fabric card utilizing IC-equivalent components to the ASIC components already described. Therefore, the method and apparatus of the invention should be afforded the broadest possible scope under examination. The spirit and scope of the present invention is limited only by the claims that follow.

What is claimed is:

1. A packet router fabric card comprising:
a plurality of ingress port circuits receiving data packets for transmission through the fabric card;
a plurality of egress port circuits receiving packets from the ingress port circuits;
switching circuits through which the ingress port circuits and the egress port circuits connect; and
a scheduling circuitry that schedules assignments for the switching circuits; wherein individual ones of the ingress port circuits organize incoming packets that are destined for a specific egress port circuit into serial data packet trains, with a train including a start-of-train (SOT) and an end-of-train (EOT) identifier, and the switching circuits, upon receiving an EOT identifier, automatically switch to a next ingress port assignment and look for a new SOT to begin transmitting a new packet train to an egress port, and wherein the ingress port circuits also track the packet train transmission to the switching circuits, and send an almost done flag (ADF) to the scheduling circuit before reaching the EOT identifier, enabling the scheduling circuit to schedule the switching circuit about to receive the EOT identifier, to look for a SOT identifier for a next packet train.

2. A method for high-speed transmission of packet data through a packet router fabric card, comprising the steps of:
(a) organizing, by an ingress port circuit, incoming packets destined for a specific egress port into a serial packet train;
(b) inserting, by the ingress port circuit, into the serial packet train a start-of-train (SOT) and an end-of-train (EOT) identifier;
(c) transmitting the serial packet train to a switching circuit;
(d) scheduling assignments for the switching circuit by a scheduling circuit including at least receiving and transmitting the packet train to a specific egress port;
(e) tracking the packet train transmission to the switching circuit by the ingress port circuit and sending an almost done flag (ADF) to the scheduling circuit before reaching the EOT identifier, enabling the scheduling circuit to schedule the switching circuit about to receive the EOT identifier, to look for a SOT identifier for a next packet train; and
(f) upon receiving the EOT identifier by the switching circuit, switching transmission to a different packet train.

* * * * *